UNITED STATES PATENT OFFICE.

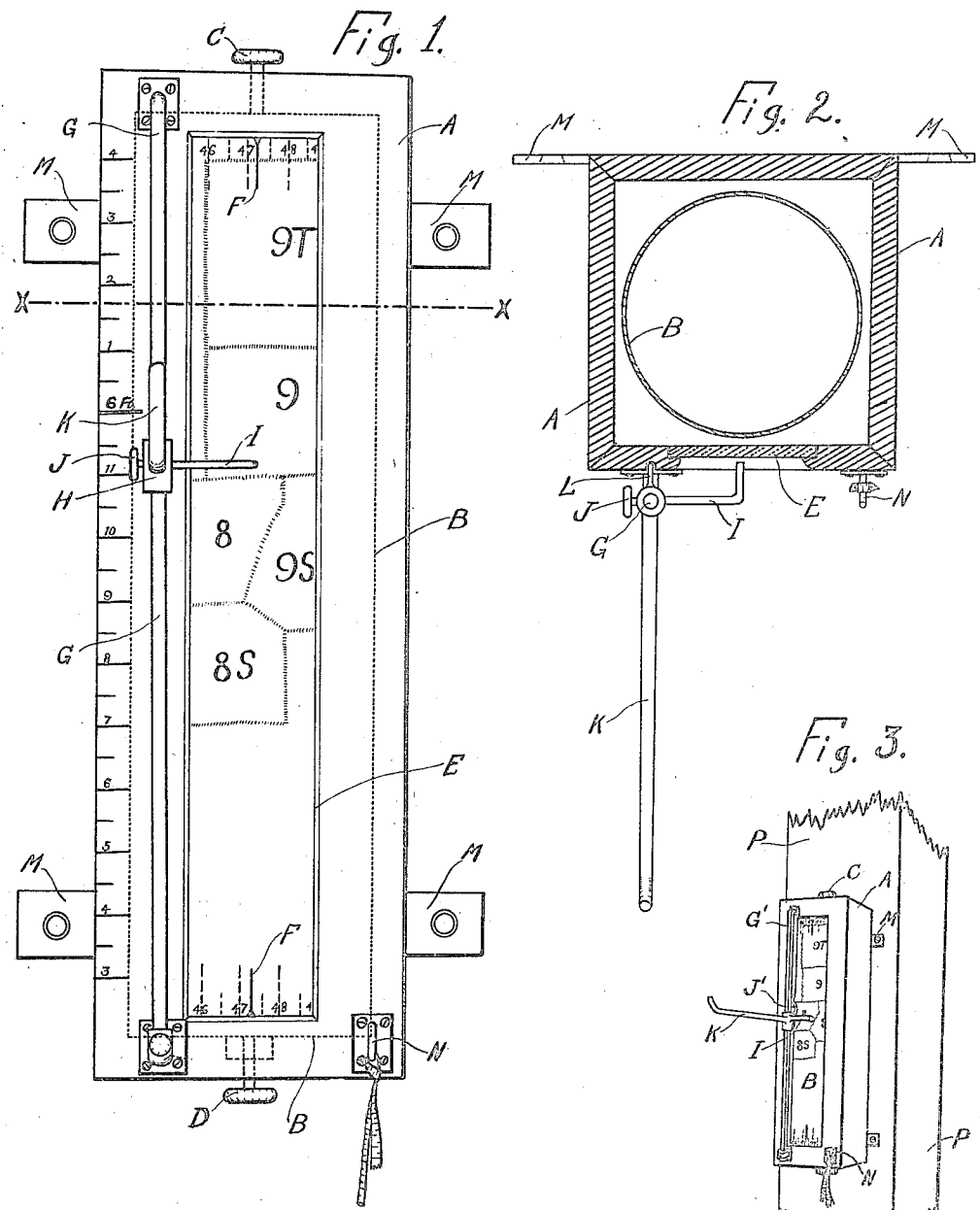

WESLEY R. TOMLIN, OF FORT COLLINS, COLORADO.

GARMENT-SCALE.

1,253,303. Specification of Letters Patent. Patented Jan. 15, 1918.

Application filed November 20, 1916. Serial No. 132,323.

*To all whom it may concern:*

Be it known that I, WESLEY R. TOMLIN, a citizen of the United States, residing at Fort Collins, in the county of Larimer and State of Colorado, have invented a new and useful Improvement in Garment-Scales, of which the following is a specification.

My invention relates to garment scales for use especially in clothing stores in measuring a customer and determining the proper size garment to fit such person, and has for its objects to provide a simple device to measure the height of a person and show at a glance the proper size garment for such person.

I attain these objects by the device illustrated in the accompanying drawing. The device illustrated and described is designed especially for use in the retail sales of "Munsing wear," and other like garments, where the sizes of garment are determined and numbered according to a person's height and chest or waist measure.

Having reference to the accompanying drawing, Figure 1 is a front view or elevation of the device. Fig. 2 is a horizontal cross-section on the line X—X of Fig. 1. Fig. 3 indicates a perspective view of the device fastened to a post or wall in position for use; the figure also indicates some slight modifications of structure.

Throughout the several figures the same letters of reference indicate the same or like parts.

A is a casing or box in which is vertically mounted a cylinder B. Cylinder B is mounted on suitable bearings and is adapted to revolve on its axis; and one or both axles of the cylinder extend through the ends of the casing and are provided with knobs C and D by means of which the cylinder may be turned with the fingers.

The front of box or casing A is open or provided with a glass plate window E through which the calibrations on the cylinder surface may be seen. F is a center mark on the glass front to indicate the proper position of the cylinder, as hereinafter explained.

G is a rod arranged longitudinally along the side of the face of box A and parallel to the axis of cylinder B, and is anchored to the face of the box in any suitable manner.

H is a gage sleeve on rod G and adapted to slide upon the rod and may be anchored at any desired position by a set screw J. I is a pointer carried by gage sleeve H and extending laterally to the center line of glass front E and turned inward to point at the surface of cylinder B. K is an arm extending outward from the gage and may be used to measure the height of a person being measured for a garment, as hereinafter explained.

In order to prevent sleeve gage H from turning upon the rod G a stud L may be provided to work in a groove in the face of the box back of and parallel to the rod G. Or the rod may be squared or angled, as indicated in Fig. 3. In place of having set screw J, a spring J' (Fig. 3) may be provided on the sleeve to hold the gage in any desired position by friction.

M are suitable brackets by which the device may be fastened to the wall or a post or pillar for convenient use. N indicates a suitable hook that may be fastened to the box for convenient hanging of a tape line for use in connection with the device.

The surface of cylinder B is calibrated to show by curves or mapped areas the sizes of garment for the fitting of which the device is to be used. For example, for use in connection with the sale of "Munsing wear," the circumference of the cylinder is graduated in equal divisions corresponding to chest measures, as from 33 inches to 52 inches, and the graduations are thus marked from 33 to 52 where the numbers can be read through glass E and under the center lines F. Altitudes on the cylinder are made to correspond with heights of persons, as from 5 feet 3 inches to 6 feet 4 inches, and curves or mapped areas are thus plotted to correspond to the sizes of garment for any particular chest measure and height. Thus, in the case of "Munsing wear," the cylinder will be properly calibrated and marked with curves or areas properly numbered with the sizes of garments, ranging from No. 1 to 9 tall.

The face of box A may be graduated in feet and inches so that gage H may be moved along rod G to any point to indicate the height of a customer for whom the garment is intended. In Fig. 1 the edge of the box face to the left of rod G is shown as graduated in feet and inches, ranging from 5 feet 3 inches to 6 feet 4 inches.

In use and operation, for example in the sale of "Munsing wear," the customer's chest measure is taken with an ordinary tape line, which for convenience is hung upon a hook upon the box of the device. Then the cylinder B is turned so the chest measure reading on the cylinder is under the line F on the glass face. Next, the gage H is moved along the rod G to a point on the scale representing the height of the customer. The pointer I will then indicate and point to the proper sized garment on the cylinder.

In actual use it is intended to have the device fastened to the wall or a pillar at such height above the floor that the scale reading at the edge of the box will be exact readings of height above the floor, and the scale is in full inch units, so that, after a customer's chest meaure is taken, he may step under the arm K and the gage may be moved down to his exact height, and the cylinder reading, after turning the cylinder to correspond with the chest measure, will give the proper size garment at a glance.

While the device shown and explained is adapted especially to "Munsing wear," it is apparent that its use is not thus limited.

I claim:

1. In a garment scale the combination of a cylinder mounted vertically in a casing and adapted to be turned upon its axis, a gage mounted on said casing and adapted to slide parallel to the axis of said cylinder, said gage having an arm extending outwardly therefrom to measure height and a pointer to indicate the height on said cylinder, substantially as described.

2. In a garment scale the combination of a casing adapted to be mounted on a wall, a calibrated cylinder mounted vertically in said casing and adapted to be turned upon its axis, said cylinder being calibrated for sizes of garments with circumference corresponding to chest measure and altitude corresponding to a person's height, a vertically adjustable gage mounted on said casing and carrying an outwardly extending arm to measure a person's height and a pointer to indicate such height on said cylinder, substantially as described.

WESLEY R. TOMLIN.

Witnesses:
WILLIAM C. BROLLIER,
ALBERT D. ABBOTT.

Copies of this patent may be obtained for five cents each, by addressing the "Commissioner of Patents, Washington, D. C."